Figure 1:
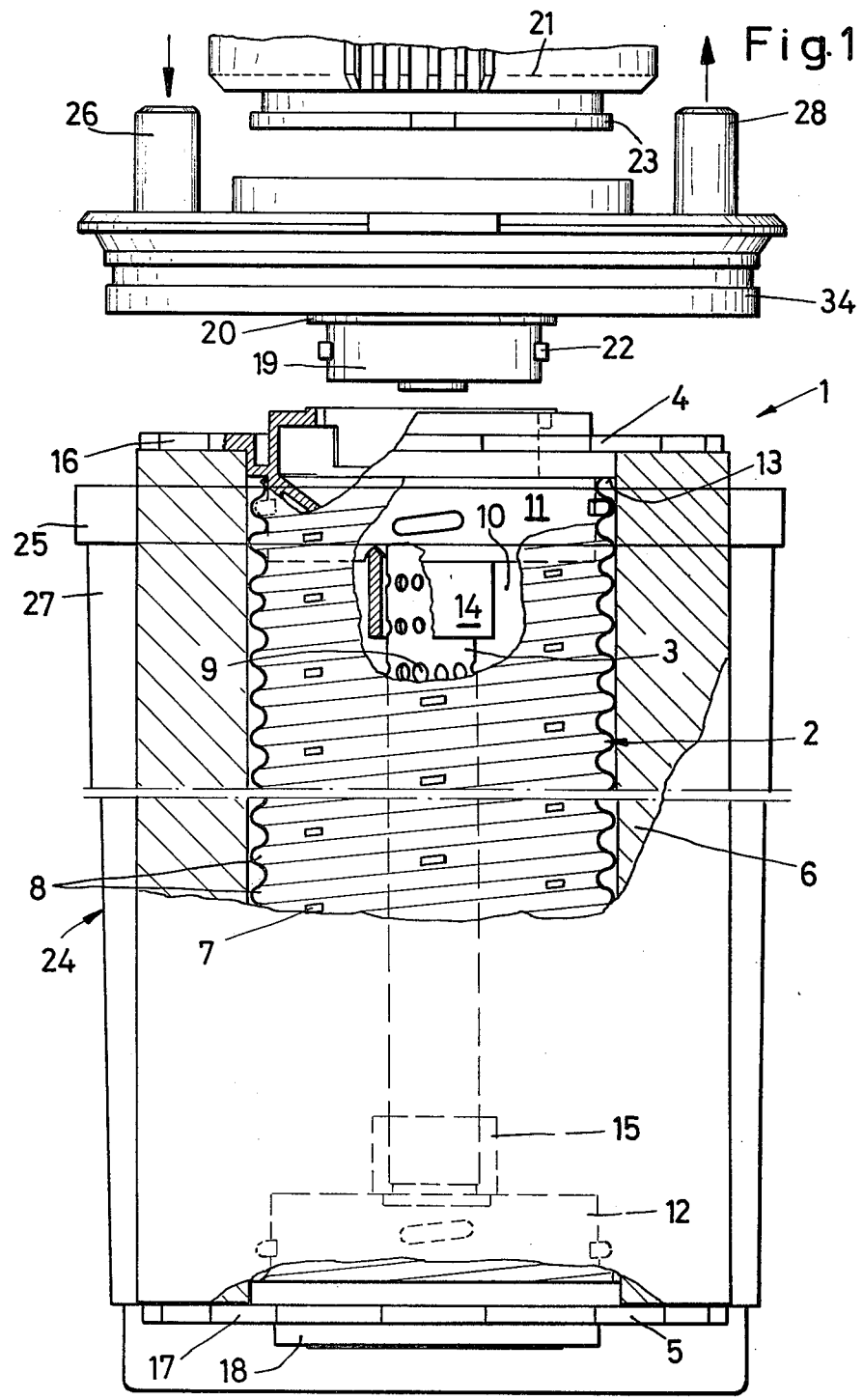

United States Patent [19]
Hofmann

[11] 4,267,042
[45] May 12, 1981

[54] WATER FILTER, IN PARTICULAR FOR AQUARIUM WATER
[76] Inventor: Kurt H. Hofmann, Eulenthal, 5063 Overath, Fed. Rep. of Germany
[21] Appl. No.: 74,714
[22] Filed: Sep. 11, 1979
[30] Foreign Application Priority Data
Oct. 6, 1978 [DE] Fed. Rep. of Germany ....... 2843641
[51] Int. Cl.³ .................... E04H 3/20; B01D 25/06
[52] U.S. Cl. ............................. 210/169; 210/315; 210/318; 210/338; 210/440; 210/442; 210/444; 210/489; 210/497.01; 210/416.2
[58] Field of Search ............... 210/169, 244, 288, 314, 210/315, 318, 338, 416 AS, 437, 440, 441, 444, 457, 487, 488, 489, 492, 497 R, 442

[56] References Cited
U.S. PATENT DOCUMENTS

| 2,378,879 | 6/1945 | Zylstra | 210/441 |
| 3,262,565 | 7/1966 | Silverwater | 210/315 |
| 3,279,614 | 10/1966 | Briggs | 210/457 |
| 3,415,382 | 12/1968 | Martin | 210/440 |
| 4,169,793 | 10/1979 | Lockshaw | 210/169 |

Primary Examiner—Charles N. Hart
Assistant Examiner—David R. Sadowski
Attorney, Agent, or Firm—Browdy and Neimark

[57] ABSTRACT

A water filter, in particular for aquarium water, comprises a filter chamber having a water inlet and a water outlet and being filled with exchangable filter material, as well as a boost pump arranged downstream of the water outlet. The filter chamber is defined by an annular space between two concentric tubes of different diameters, the outer tube having as water inlet a perforation arranged spaced around its entire circumference and its entire length and the inner tube likewise being provided with a perforation around its entire circumference and its entire length. At one end of the inner tube, a water outlet line is connected, while the other end of the inner tube is closed. With this structure, the entire filter material employed may be completely utilized, and also, the exchanging of the filter material is simpler.

9 Claims, 4 Drawing Figures

WATER FILTER, IN PARTICULAR FOR AQUARIUM WATER

This invention relates to a water filter, in particular for aquarium water, including a filter chamber having a water inlet and a water outlet and being filled with exchangable filter material, as well as a boost pump arranged downstream of the water outlet.

For filtering aquarium water, filters are conventional wherein a container is divided into a clear water chamber as well as a filter chamber. The filter material, for instance synthetic padding or the like, is passed in filters of this type from the bottom to the top or in the opposite direction throughout the entire height, the contamination particles such as sludge and the like being caught in the filter material. In these filters, the filter material very rapidly clogs at the inlet, so that the filter loses its optimum filtering performance after only a short period of time. Therefore, the filter material must be exchanged very frequently.

An object of this invention is to provide a water filter, in particular for aquarium water, which remains effective at an optimum throughout an extended period of time with one and the same filter material filling.

The invention features a filter chamber which is defined by an annular space between two concentric tubes of different diameters, the outer tube has as water inlet a perforation arranged spaced around its entire circumference and throughout its entire length, the inner tube is likewise provided with a perforation around its entire circumference and throughout its entire length and a water outlet line is connected to one end of the inner tube, while the other end of the inner tube is closed.

With the water filter according to the invention, the water to be filtered enters the filter chamber filled with the filter material from all sides throughout the entire height and from there passes into the perforated inner tube, from where the purified water is drawn off. The water flow through the filter material thus is substantially normal of the axis of the annular space, so that all regions of the filter material collect dirt in an identical manner. With this structure, the entire filter material employed may thus be fully utilized. Thereby, not only is the effective usability time of a filter material filling prolonged, but the filter also remains effectively operative at an optimum for a much longer period of time. Finally, also the exchanging of the filter material is very simple, since the tubes defining the filter chamber define a cartridge easy to manipulate which is able to readily be emptied and refilled.

Preferably, the outer perforated tube is surrounded by a shell of water-permeable foam. By this structural measure, it is also possible in a very simple manner to obtain a dual filtering effect, the water to be purified initially passing through the foam shell in which the coarse particles are initially caught. The second stage of filtering then occurs in the inner filter chamber, which in this embodiment is exposed to lesser dirt particles so that thereby a further prolongation of the time of optimum filtering effect is able to be achieved. The outer foam shell for exchanging the filter material merely has to be stripped off the cartridge and pressed clean in clear water.

The outer tube of the filter cartridge may be formed as a corrugated tube with helical corrugation, the perforation respectively being provided between the outwardly directed corrugation ribs. As corrugated tube, for instance a thinwalled plastic tube may be used. The helical, outwardly directed corrugation produces a flow pattern around the tube so that the water to be purified always mainly flows to those filter regions in which the filter material is the least clogged. Thereby, a uniform clogging of the filter material is insured, and the functionability of the filter is extended with a single filter material filling.

The use of the corrugated tube in addition thereto also is of an advantage structurally. At both ends of the corrugated tube, end caps may be screwed on which have radially projecting flanges, the two end caps having central locations for retaining the inner perforated tube, the end cap at the water outlet additionally having a central water outlet opening. The radially projecting flanges of the end caps at the same time serve to retain the outer foam shell serving as a prefilter.

The end cap arranged at the water outlet may have a bajonet connection for a connection of the water outlet to the suction tube of a pump. Thereby, the assembly or removal of the filter cartridge for exchanging the filter material is very simple.

When using the filter as an external filter, the filter cartridge defined by the concentric tubes may extend into an upright, bucket-like vessel the inner diameter of which is somewhat larger than the outer diameter of the filter cartridge. The upper end cap of the filter cartridge may then directly be connected to a pump casing secured to the closure of the filter vessel, the filter water inlet passing through the closure into the outer annular space between the inner wall of the filter vessel and the filter cartridge.

When using the filter as internal filter, the end cap of the filter cartridge provided with the water outlet opening may be connected to a pump casing via a suction tube adjustable in its length telescopically. By virtue of the suction tube adjustable in its length, the optimum immersion depth of the cartridge into the aquarium water may be selected. For connecting the suction tube to the respective end cap of the filter cartridge on the one hand and the pump casing on the other hand, bajonet closures may be provided which substantially simplify assembly.

When using the filter as internal filter, for greater filter performances also a plurality of filter cartridges may be intercoupled. For instance a plurality of filter cartridges may be interconnected via coupling members, namely in a series connection. Such a series of filter cartridges may for instance be deposited on the bottom of a larger aquarium. Alternatively, for coupling a plurality of filter cartridges also the water passage openings of the end caps of a plurality of cartridges may be connected to a common collecting vessel, said collecting vessel being connected to a riser tube leading to a common pump. The collecting vessel conveniently has a flat shape, is provided in the middle of its surface with a connection for the riser tube and is provided around said connection with the connections for a plurality of filter cartridges. Such an arrangement with a plurality of filter cartridges arranged in parallel is very well suited for fountain springs, outdoor pools and the like, the entire apparatus being placed flatly on the bottom so that the filter cartridges are directed upwardly with their closed ends. All connections are preferably defined by bajonet connections.

In all embodiments, the pump casing may be connected via a bajonet connection to a drive motor with a universally closed housing, the drive from the motor to the pump being effected via magnetic flights acting through the walls of the casing and housing, respectively.

Figure 2:
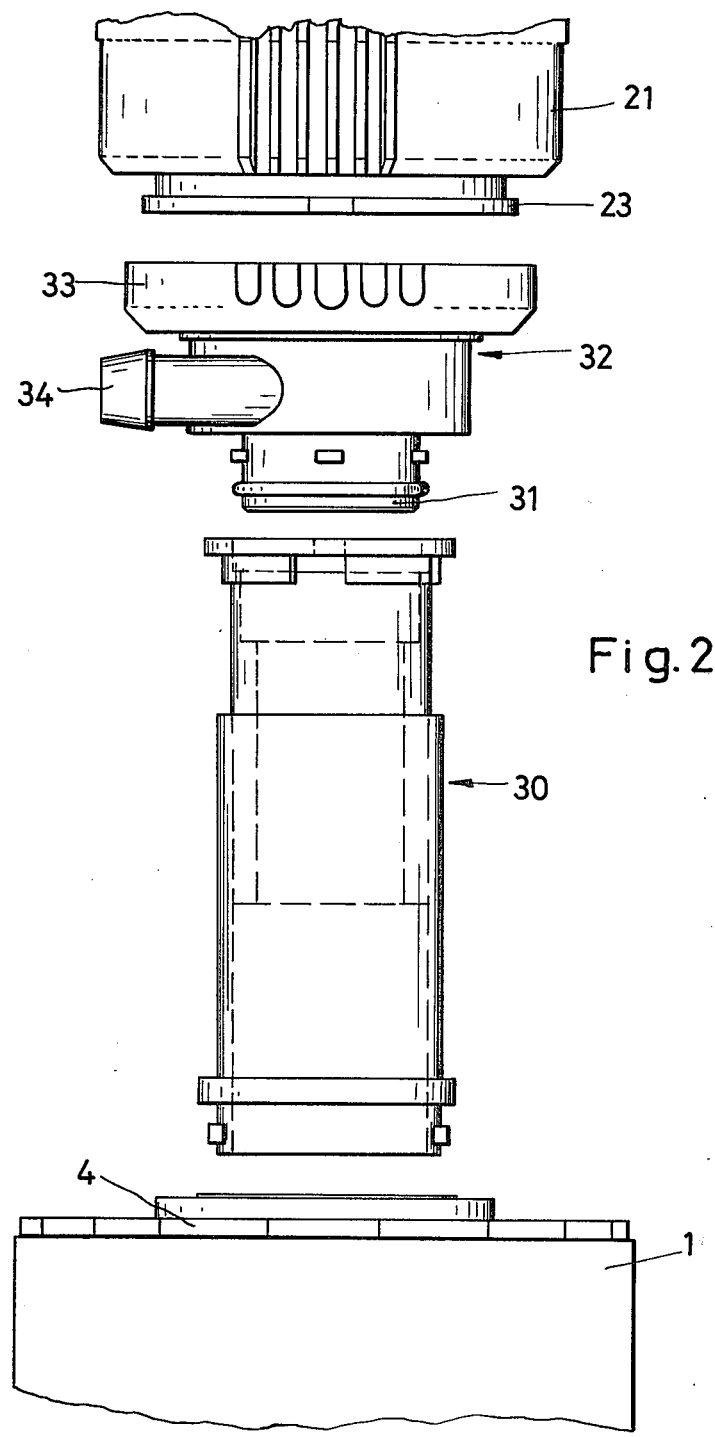
Figure 3:
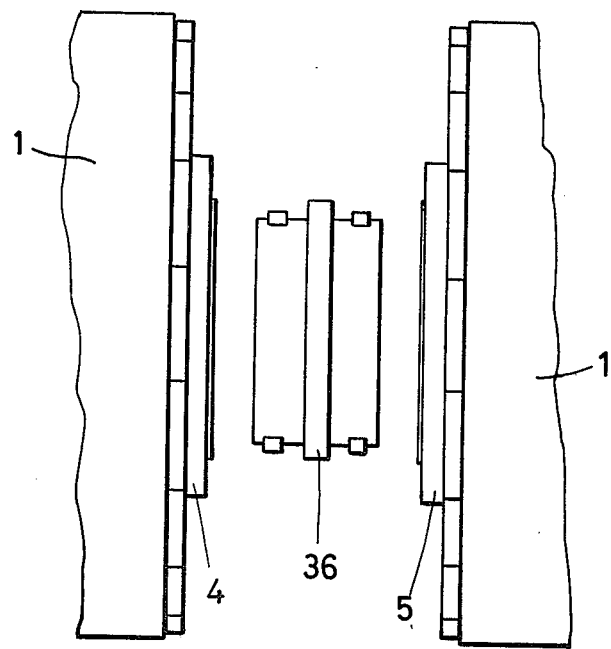
Figure 4:
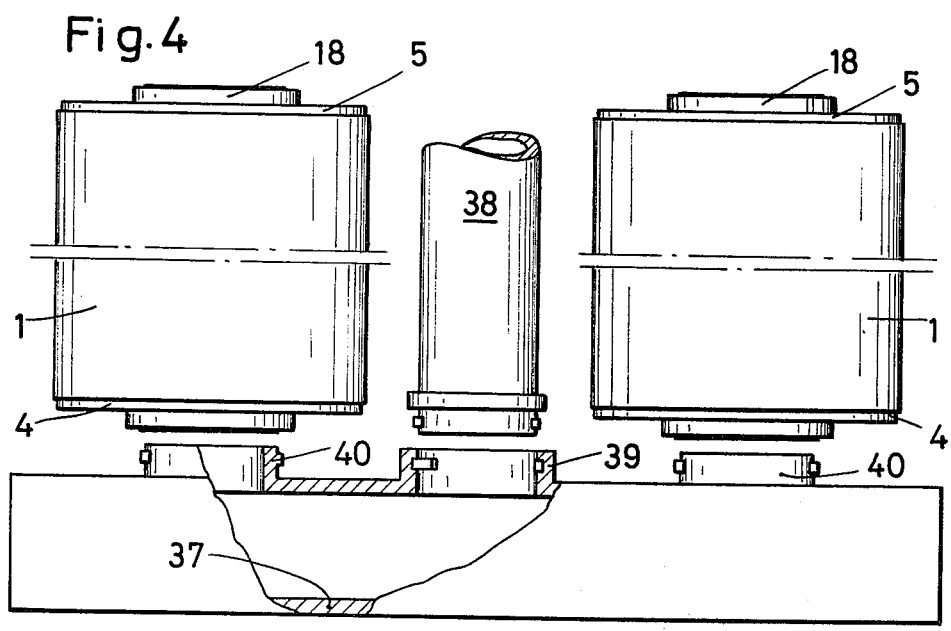

The invention is illustrated by way of example in the drawings and described in detail hereinafter in referring to said drawings. Therein:

FIG. 1 is an illustration of the parts of an external filter, partially in section, in an exploded view, FIG. 2 is an exploded view of the parts of an internal filter, FIG. 3 are two filter cartridges to be connected by a coupling member, and FIG. 4 are a plurality of filter cartridges connected to a common collecting vessel.

As shown in the drawings, the essential component both of the external filter and of the internal filter is a filter cartridge 1. This comprises an outer tube 2, an inner tube 3 arranged concentrical therein, end caps 4 and 5 as well as an outer shell 6 of water-permeable foam.

The outer tube 2 is formed as corrugated tube with a helical corrugation and has a perforation 7 around its entire circumference and throughout its entire length, said perforation respectively being disposed between the outwardly directed corrugation ribs 8.

The concentrically arranged inner tube 3 is substantially cylindrical and is likewise provided with a perforation 9 around its entire circumference and throughout its entire length.

The annular space 10 defined between the two concentrically arranged perforated tubes 2 and 3 is filled with a filter material such as synthetic padding or the like.

The two end caps 4 and 5 provided at the two ends of the concentric tubes 2 and 3 are formed as one-piece plastic injection-molded parts. The ends of the end caps 4 and 5 directed toward the annular filter space 10 are provided with screw sockets 11 or 12 which are screwed into the threads formed by the corrugation ribs 8. The end caps 4 and 5 may be screwed into the corrugated tube 2 so far until a projecting shoulder 13 at the faces of the outer tube 2 is abutted. In their centers, the end caps 4 and 5 have tubular sockets 14 or 15 into which the inner tube 3 engages and thereby is retained in a concentric position relative to the outer tube 2.

Furthermore, the two end caps 4 and 5 are provided with radially projecting flanges 16 or 17 which in particular serve to arrest the foam outer shell 6.

In the middle of the end caps 5 and 4 there are provided passages. In the lower end cap 5, however, the water passage is shut by a plug 18. At the upper end cap 4, the water passage opening is directly connected to the suction tube 19 of a centrifugal pump 20 which is drivable via a motor 21. The suction tube 19 of the centrifugal pump 20 may be connected by means of a bajonet closure 22 directly to the water outlet opening of the upper end cap 4. In the same way, the motor 21 provided with a universally closed housing is connected via a bajonet connection 23 to the top side of the centrifugal pump 20.

The casing of the centrifugal pump is directly connected to a closure 34 for an upright, bucket-like vessel 24 in which the filter cartridge is able to be installed. In the installed position, the filter cartridge completely immerges into the vessel 24, while the closure 34 is firmly and sealingly located on the upper edge 25 of the vessel 24. For sealing all parts, additionally seal rings may be used.

The operation of the external filter is thus:

After assembly of the individual parts, the water to be filtered is introduced into an inlet socket 26 which is arranged at the top of the closure 34, said water entering the annular space 27 remaining free between the inner wall of the vessel 24 and the outer wall of the filter cartridge 1. From there, the water initially enters the foam shell 6 encompassing the cartridge 1, where the coarsest sludge particles are trapped. Then the pre-filtered water passes to the corrugated outer tube 2 where it enters the annular filter chamber 10 through the perforation 7. Upon flowing through the filter material, also the smaller contamination particles in the water are trapped, and the completely purified water finally passes through the perforation 9 into the clear water chamber defined by the inner space of the inner tube 2, from which it is drawn into the centrifugal pump 20 via the suction socket 19 and is pressed through an outlet socket 28 passing through the closure 34. From there, the purified water is for instance returned to the aquarium.

In the embodiment illustrated in FIG. 2, the cartridge 1 serves as an internal filter, i.e. suspended directly into the fluid to be purified, for instance aquarium water. The filter cartridge is of the same structure as in the embodiment illustrated in FIG. 1 so that the filter cartridge need not be discussed again.

So that the cartridge in this embodiment is height-adjustable, a riser tube 30 adjustable in length telescopically is connected to the end cap 4, the upper end of said riser tube being able to be connected to the suction tube 31 of the casing of a centrifugal pump 32. The centrifugal pump 32 is secured by means of a encompassing ring 33 to the bajonet closure 23 of the motor 21 already illustrated in FIG. 1.

In this embodiment, the water to be purified, into which the cartridge 1 is immerged, enters the foam shell 6 all around and at a simultaneous purification enters the interior of the perforated inner tube 3, from where the purified water is drawn by the centrifugal pump 32 via the riser tube 30. The purified water is removed via an outlet socket 34 passing laterally from the casing of the centrifugal pump 32.

When using the cartridge 1 as internal filter, it is also possible according to the embodiment illustrated in FIG. 3 to interconnect a plurality of filter cartridges via coupling members 36. The filter cartridges are of the same structure as the one illustrated in detail in FIG. 1. For connecting two cartridges, at the one cartridge the plug 18 located in the end cap 5 is removed, and instead, the coupling member 36 is inserted. For connecting the coupling member 36 to the end cap 5, the same bajonet closure is used which has also been used for securing the plug 18. In the assembled condition, the end cap 5 of the one filter cartridge is firmly and sealingly closed by the end cap 4 of the other filter cartridge via the coupling member 36. Following this pattern, also more than two cartridges 1 may be interconnected.

According to FIG. 4, a plurality of filter cartridges 1 are connected in a parallel arrangement to a common flat collecting vessel 37. The collecting vessel 37 formed for instance circular or star-like has a central bajonet connection 39 at its top side for a riser tube 38 which may be of the same construction as the riser tube 30 adjustable in length telescopically illustrated in FIG. 2. Around the riser tube connection 39, there are provided bajonet connections 40 for the cartridges 1. The cartridges 1 are placed with the outlet openings of their end caps 4 on the bajonet connections 40 and connected thereto by a slight rotation. The upwardly directed end caps 5 are shut by a plug just like in the embodiment illustrated in FIG. 1.

What is claimed is:

1. A water filter, in particular for aquarium water, including a filter chamber having a water inlet and a water outlet said filter chamber being filled with exchangeable filter material, as well as a boost pump arranged downstream of said water outlet, wherein said filter chamber is defined by the annular space between two concentric tubes of different diameters, the outer tube being formed as a corrugated tube with helical corrugation ribs and having as said water inlet a series of perforations arranged space substantially around its entire circumference and substantially throughout its entire length, wherein the perforations are respectively disposed between the outwardly directed corrugation ribs, said outer tube being encompassed by a shell of water-permeable foam, the inner tube being likewise provided with a series of perforations arranged substantially around its entire circumference and substantially throughout its entire length, and screw-threaded end caps screwed onto both ends of said outer tube, said end caps having radially projecting flanges, said two end caps having central locations for retaining said inner perforated tube and wherein the end cap arranged at the water outlet has a central water outlet opening in fluid tight connection with the interior of said inner tube to which is connected a water outline line, while the other end of the inner tube is closed.

2. A water filter as set forth in claim 1, wherein the end cap arranged at the water outlet has a bajonet connection for a connection of the water outlet to the riser tube of a pump.

3. A water filter as set forth in claim 1, as an external filter, wherein the filter cartridge defined by the concentric tubes extends into an upright, bucket-like filter vessel the inner diameter of which is a little larger than the outer diameter of the filter cartridge, wherein the upper end cap of the filter cartridge is directly connected to a pump casing secured to the closure of the filter vessel, and wherein the filter water inlet opens through the closure into the outer annular space between the inner wall of the filter vessel and the filter cartridge.

4. A water filter as set forth in claim 1, as an internal filter, wherein the end cap provided with the water outlet opening, of the filter cartridge, is connected by means of a riser tube adjustable in its length telescopically to the pump casing.

5. A water filter as set forth in claim 4, wherein for connecting the riser tube to the end cap of the filter cartridge provided with the water outlet opening, on the one hand, and the pump casing, on the other hand, bajonet connections are provided.

6. A water filter as set forth in claim 4, wherein a plurality of filter cartridges are interconnected via coupling members.

7. A water filter as set forth in claim 4, wherein the water passage openings of the end caps of a plurality of filter cartridges are connected to a common collecting vessel and wherein said collecting vessel is connected to a riser tube passing to a pump.

8. A water filter as set forth in claim 7, wherein the collecting vessel is of a flat shape, has a connection for the riser tube in the middle of its upper surface, and is provided around said connection with the connections for a plurality of filter cartridges.

9. A water filter as set forth in claims 1, wherein the pump casing is connected via a bajonet connection to a drive motor having a universally sealed housing, the drive being effected via magnetic flights acting through the walls of said casing and housing, respectively.

* * * * *